(12) United States Patent
Garg et al.

(10) Patent No.: US 8,073,751 B2
(45) Date of Patent: Dec. 6, 2011

(54) AUTOMATED REVIEW AND HOLD PLACEMENT

(75) Inventors: Atul Garg, Waxhaw, NC (US); Connie Rivenbark, Brooksville, FL (US); Ettre Vee Howard, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 933 days.

(21) Appl. No.: 11/555,038

(22) Filed: Oct. 31, 2006

(65) Prior Publication Data
US 2008/0195514 A1   Aug. 14, 2008

(51) Int. Cl.
*G06Q 40/00*   (2006.01)
(52) U.S. Cl. .................. 705/35; 705/39; 705/43; 705/44
(58) Field of Classification Search ....... 705/35
See application file for complete search history.

(56) References Cited

U.S. PATENT DOCUMENTS
2003/0059098 A1 *  3/2003  Jones et al. .................. 382/135

FOREIGN PATENT DOCUMENTS
| EP | 1507243 A | 2/2005 |
| WO | 03040881 A | 5/2003 |
| WO | 2004036386 A | 4/2004 |
| WO | 2005006269 A | 1/2005 |

OTHER PUBLICATIONS

International Search Report completed Apr. 23, 2008 for corresponding PCT/US2007/083198.

* cited by examiner

*Primary Examiner* — Charles Kyle
*Assistant Examiner* — Irene Kang
(74) *Attorney, Agent, or Firm* — Banner & Witcoff, Ltd.; Michael A. Springs (57) ABSTRACT

A method for automated processing of deposit items at a computing device is described. A deposit item, such as case, a personal check, or certified check, is received at a computing device. The deposit item may represent a request to deposit funds of at least one monetary item into a user account, such as a checking or savings account. A computer associated with the computing device determines whether to hold the funds of the at least one monetary item from deposit into the user account. If it is determined to hold the funds, an amount of the funds to hold and a time period in which to hold the amount of funds may be determined.

28 Claims, 6 Drawing Sheets

AUTOMATED REVIEW AND HOLD PLACEMENT

BACKGROUND

People want convenience and automated teller machines (ATMs) have provided that convenience to people. People can utilize an ATM associated with their bank or with other banks provided they share a common network. People want access to their money as quickly as possible and ATMs provide such a service. If a person deposits a check from work into an ATM, the process for how long before the funds of a check are available is dictated by Title 12, Chapter 2, Part 229 of the U.S. Code. This statute commonly is referred to as Regulation CC. Regulation CC describes how long a financial entity, such as a bank, may place a hold on deposit items before making them available to a consumer.

The review and hold placement process for ATM deposits takes place in numerous ATM deposit services (ADS) sites which manually places holds on items based on fraud scrutiny and criteria. The process is a manually intensive procedure resulting in an inefficient process and at times is non-compliant with Regulation CC due to mistakes from a manual interpretation of a highly complex regulation. Liability Risk Management (LRM) establishes policies/business rules on which suspected fraudulent deposits should have a hold placed on them. Processing at an ADS unit may include in excess of 30 people of which 5 or more may be dedicated to the review and hold placement process.

The ADS unit processes the paper side of the ATM deposits by matching the deposited items with the ATM deposit automated processing (ADAP) system tickets that are generated from the customer's electronic ATM transaction. While the deposit transaction is electronically posted, the deposits are then scored and manually reviewed based on the depositing customer's risk score. This includes a check acceptability and negotiability review as well as fraud prevention. Then the ADAP ticket and the deposited items are processed through item processing for posting to a general ledger associated with a financial entity of the ATM.

Recent developments with image-enabled ATMs has resulted in fewer envelope-based deposits for the ADS sites to process. As the deposit process is transitioned to a Universal Landing Zone (ULZ) and associated systems, a hold review and placement process is still required. The ULZ performs data perfection processes to prepare image deposits for posting, balancing, codeline corrections, and image quality. Although image-enabled ATMs provide some additional expedited processing, the manual process associated with reviewing and hold placement processing still hinders financial entities and customers.

Gathered data has shown the error rate associated with manual holds to be approximately 15%. Considering the fact that liability for non-compliance with Regulation CC consists of up to $1,000 per transaction or $500,000 per class action suit, together with attorney's fees, an automated review and hold placement process is needed.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to at least one aspect of the present invention, a computer performs a method for processing deposit items. The method includes the receipt of a deposit item. The deposit item represents a request to deposit funds of one or more monetary items into a user account. The request may be a deposit slip with an account number associated with the user account and the one or more monetary items. A computer may automatically determine whether to hold the funds of the one or more monetary items from deposit into the user account. The computer may also determine the amount of funds to hold and a time period in which to hold the amount of funds. The computer may also automatically place a hold on the account.

According to another aspect of the present invention, a computer may determine a type of the deposit item. The type of the deposit item may be cash, a negotiable instrument, or one or more of a combination of the two types. The computer may determine the total monetary amount of the cash being requested for deposit and the total monetary amount of negotiable instruments being requested for deposit. The total of the two monetary amounts may be compared to a deposit slip or other input identifying a total amount of funds to deposit. If a problem exists between the indicated total and the determined total, a user may be notified of the problem for correction and/or the user account may be automatically adjusted to correct the problem.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
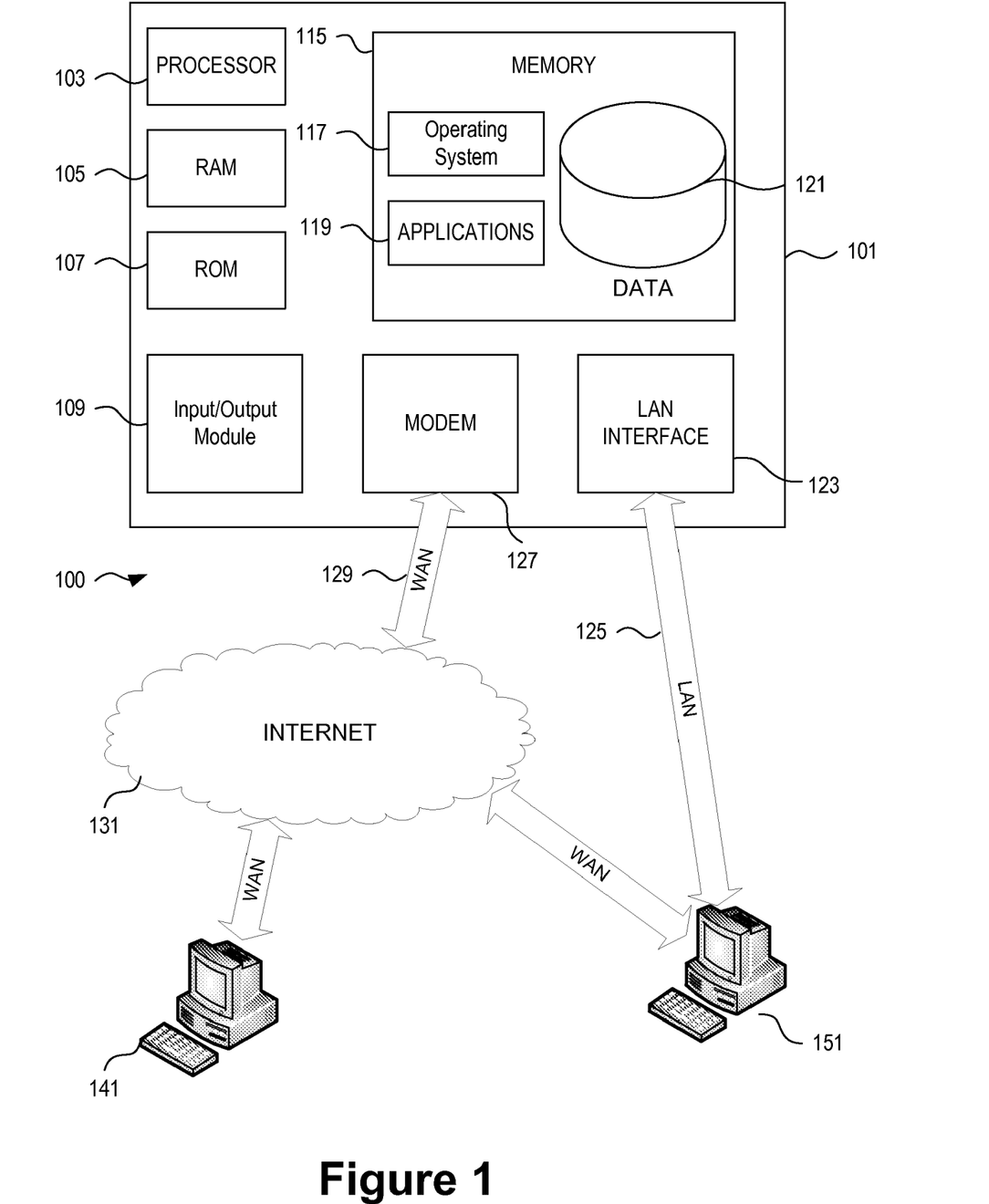
FIG. 1 illustrates a schematic diagram of a general-purpose digital computing environment in which certain aspects of the present invention may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, input/output module 109, and memory 115. Computer 101 typically includes a variety of computer readable media. Computer readable media can be any available media that can be accessed by computer 101 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 101. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although not shown, RAM 105 may include one or more are applications representing the application data stored in RAM memory 105 while the computer is on and corresponding software applications (e.g., software tasks), are running on the computer 101.

Input/output module 109 may include a microphone, keypad, touch screen, and/or stylus through which a user of computer 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of computer 101's computer executable instructions may be embodied in hardware or firmware (not shown). As described in detail below, the database 121 may provide centralized storage of account information and account holder information for the entire business, allowing interoperability between different elements of the business residing at different physical locations.

Computer 101 may operate in a networked environment supporting connections to one or more remote computers, such as branch terminals 141 and 151. The branch computers 141 and 151 may be personal computers or servers that include many or all of the elements described above relative to the computer 101. The network connections depicted in FIG. 1 include a local area network (LAN) 125 and a wide area network (WAN) 129, but may also include other networks. When used in a LAN networking environment, computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Terminals 141 or 151 may also be mobile terminals including various other components, such as a battery, speaker, and antennas (not shown). Input/output module 109 may include a user interface including such physical components as a voice interface, one or more arrow keys, joystick, data glove, mouse, roller ball, touch screen, or the like. As described herein, input/output module 109 may also include a reader/scanner to read/scan deposit items, including monetary items, to identify the type of monetary item it is. Such readers/scanner may read magnetic ink character recognition (MICR) data and/or other data from the monetary items for identification of the type of monetary item.

Figure 2:
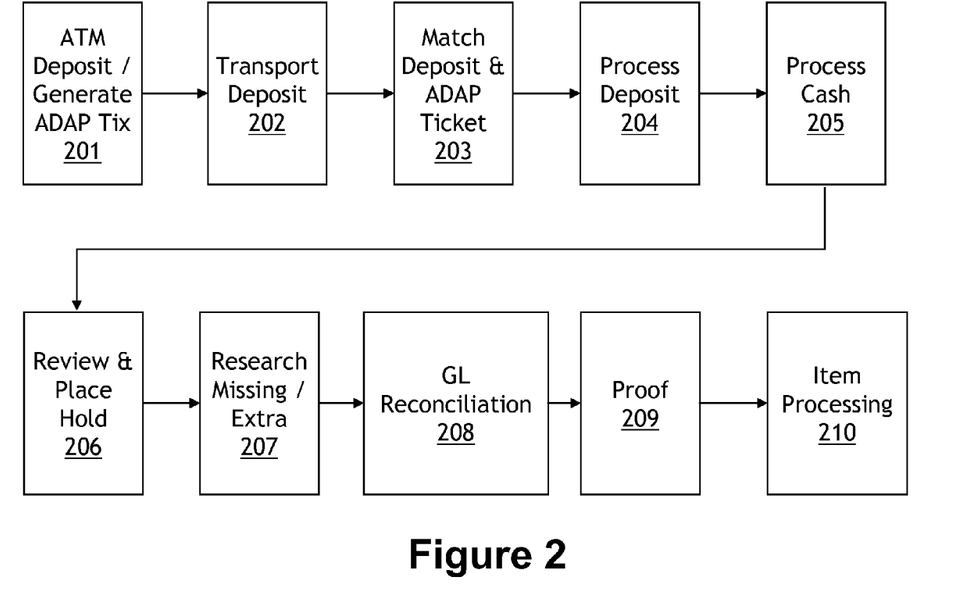
FIG. 2 is a flow chart of an illustrative method for processing deposit items.

FIG. 2 is a flow chart of an illustrative method for processing deposit items. At step 201, an ATM receives one or more deposit items and generates an ATM deposit automated processing system ticket per deposit in the ADS. Such an example may be a case where an account owner accesses her user account at the ATM and deposits one or more personal checks with a deposit slip in a paper envelop, and she receives a paper receipt of the transaction. Next, at step 202, the deposit items are picked up by an armored carrier service and transported to a manual processing site. At step 203, the deposit item is matched with the ATM deposit automated processing system ticket. Such a step may be performed by manual entry.

Proceeding to step 204, the deposit items are processed to determine the amount of funds to deposit into the respective user accounts. Such a step may include processing of checks or other negotiable instruments. At step 205, any cash of a deposit item is processed. Such a step may include counting of all monetary funds in the envelope of the deposit item. At step 206, a review and hold placement process is performed by manual entry of information by one or more people. Such a step may be a determination by a person as to whether to hold or not hold an account associated with the deposit item. A decision may be made based upon the appearance of a deposit item being fraudulent, such as being inaccurate.

At step 207, missing or extra information may be researched, and, at step 208, a general ledger of a financial entity is reconciled against any deposit items identified as needing extra attention. At step 209, the deposit items are proofed and, at step 210, they are processed to the general ledger.

Figure 3:
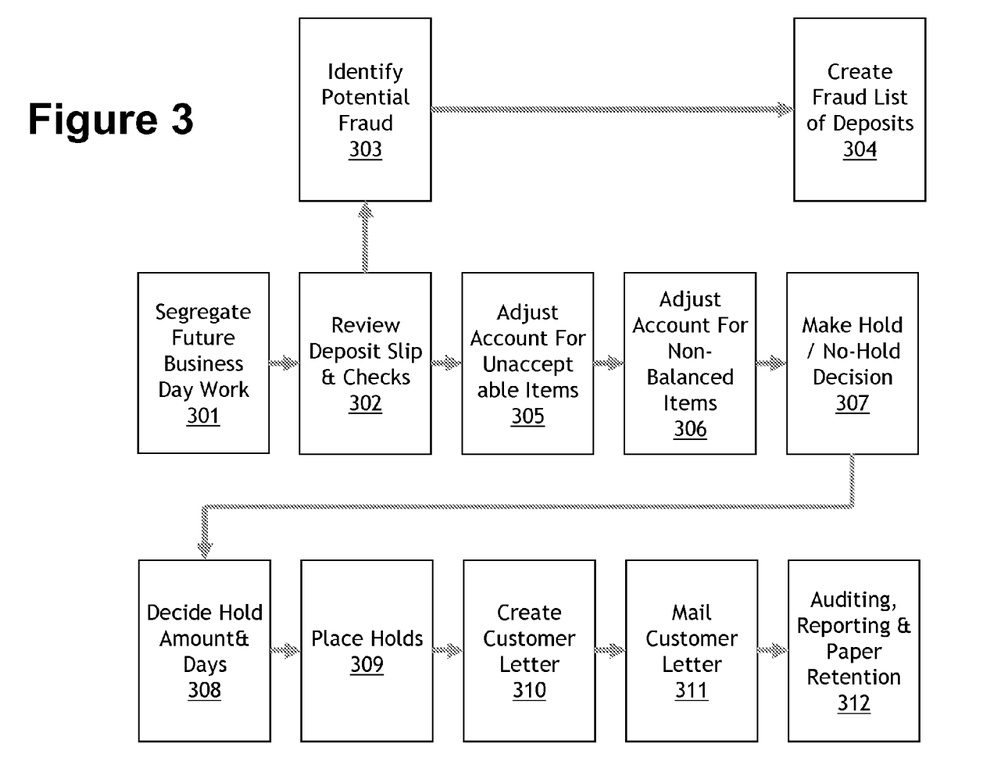
FIG. 3 is a flow chart of an illustrative method for review and hold placement processing in accordance with at least one aspect of the present invention.

FIG. 3 is a flow chart of an illustrative method for reviewing and hold placement processing with respect to reference element 206 in FIG. 2 in accordance with at least one aspect of the present invention. At step 301, for each deposit item, a deposit posting day is recognized and an appropriate adjustment date impacting available funds is determined. Such a posting day may be determined by where a customer's account is domiciled and when the deposit item was made with regard to posting cut off times that are ATM specific. Future business day work is segregated from the current business day work. In accordance with one or more aspects of the present invention, this step 301 may be automatically implemented by a computing device.

Under the conventional system, an operator manually reviews a deposit slip and any monetary items for a deposit item. A missing item, an empty envelope, an unacceptable item, and an improper endorsement are examples where an operator may manually enter an adjustment. Alternatively, in accordance with one or more aspects of the present invention, at step 302, magnetic ink character recognition (MICR) data may be read from items being deposited. Example MICR data includes a routing and transit number (RT), a serial number, an account number of a user, an amount of a monetary item, and identification data associated with a type of monetary item.

Then, under the conventional system, the operator also visually identifies the type of deposit item. Examples of such visual identification include whether the deposit item is required for next day availability in accordance with Regulation CC. Examples of deposit items include cash, a U.S. Treasury item, a U.S. Postal Money Order, a Traveler's Check, a Federal Home Loan check, as a Federal Home Loan check cannot have a hold placed on it by law, and a Federal Reserve Bank check. Other characteristics include a cashier's check, official check, teller's check, certified check, local check, out of state check, and local government checks, whether by a city, state, or county. Other examples also include exceptions as defined by Regulation CC, including repeated overdrafts, redeposited checks, new accounts, deposited checks that exceed $5,000.00, and emergency or special conditions.

Alternatively to the conventional system, in accordance with one or more aspects of the present invention, a computing device identifies a type of deposit item and then determines deposit item characteristics to base a hold/no hold decision. Examples of such characteristics include whether the deposit item is required for next day availability in accordance with Regulation CC. Examples include cash, a U.S. Treasury item, a U.S. Postal Money Order, a Traveler's Check, a Federal Home Loan, and a Federal Reserve Bank check. Other characteristics include a cashier's check, official check, teller's check, certified check, local check, out of state check, and local government checks, whether by a city, state, or county. Still other examples also include exceptions as defined by Regulation CC, including repeated overdrafts, redeposited checks, new accounts, deposited checks that exceed $5,000.00, and emergency or special conditions. In further accordance with one or more aspects of the present invention, the computing device may not be able to determine each and every deposit item that it processes. As such, if not already identified by the computing device, any undetermined deposit items may then be visually determined by an operator.

Under the conventional system, an operator reviews the deposit items to identify suspicious fraud characteristics, and the operator manually generates a fraud list of deposits selected as being potentially fraudulent. Examples of fraud characteristics may include an indication that the payee name has been altered or that an amount on the deposit item has been altered. In accordance with one or more aspects of the present invention, at step 303, a computing device may review the deposit items to identify suspicious fraud characteristics. Then, at step 304, the computing device automatically generates a fraud list of deposits selected as being potentially fraudulent and/or adds data associated with the deposit item to an existing fraud list. As part of this step, the computing device may generate a daily watch list, which is accessible online. This daily watch list identifies data associated with potentially fraudulent deposit items for access by other computing devices and/or people. In addition, problematic deposit items that are not considered fraudulent, such as an empty envelope situation, may be handled and/or identified differently by the computing device. In such a situation, the deposit items associated with an empty envelope may be automatically processed to inform a user of the account associated with the deposit item that the envelope is or was empty.

Under a conventional system, an operator adjusts, i.e., debits, for unacceptable items, and a paper item is created to ensure that the proof balances. Typically, deposits are sent to a proof and then the proof balances the deposits. A proof is a place where checks are encoded with the dollar amount and where the deposits are balanced. In this manual environment, the financial data entry system posts all of the transactions. Then, the operator adjusts (debits) for non-balanced items. In accordance with one or more aspects of the present invention, at step 305, adjustments for unacceptable items are automatically made to a user's account by a computing device, and the computing device then adjusts the user's account for non-balanced items in step 306.

Then, under a conventional system, an operator may make a manual hold or no hold decision. Alternatively, in accordance with one or more aspects of the present invention in step 307, a computing device determines whether to hold a particular deposit item. In an alternative manner, an operator may override the automated system to make a differing determination and/or to review the determination of the computing device. The determination by the computing system may be based upon a liability risk system (LRS) deposit risk score. Such a deposit risk score is well known in the industry.

Proceeding, under a conventional system, the operator decides the amount of the hold and the number of days to place a hold on the account and she manually places a hold on the user account. Alternatively, in accordance with one or more aspects of the present invention, in step 308, a computing device may determine the monetary amount of the hold and the time period in which to place a hold on the user account. At step 309, a hold may be placed on the user account by the computing device. If a particular deposit item is not to have a hold placed on an associated user account, then steps 309-311 may be bypassed.

Proceeding under a conventional system, a customer letter is manually created for each deposit item identified as initiating a hold on the user account, and the customer letter is mailed manually to the customer corresponding to the user account that has been placed on hold. Finally, papers are manually retained for auditing and reporting purposes.

In accordance with one or more aspects of the present invention, at step 310, a customer letter may be automatically created, by the computing device, for each deposit item identified as initiating a hold on the user account. With respect to this step, the computing device may utilize a template and associate account information of the user with the letter to generate a specific letter to the account owner with respect to the hold being placed on his/her account. The computing device may utilize one or more memories to associate data and generate a customer letter. At step 311, the customer letter may be automatically mailed to the customer corresponding to the user account that has been placed on hold. Again, the computing device may directly process data in order to mail the customer letter and/or may include instructions for another device, such as printing specific computer, to print and mail a customer letter. Still further, electronic communication may be utilized in addition to or in place of a physical letter. In such a situation, the created customer letter from step 310 may be incorporated into an email message and/or other electronic notification to inform a user of an account that his/her account currently has a hold in place. Finally, at step 312, data representative of any aspect of the processes of steps 301-311 may be retained for auditing and reporting purposes in a memory associated with the computing device. Such a memory may be locally stored and/or may reside in an area physically separate from the computing device.

Figure 4A:
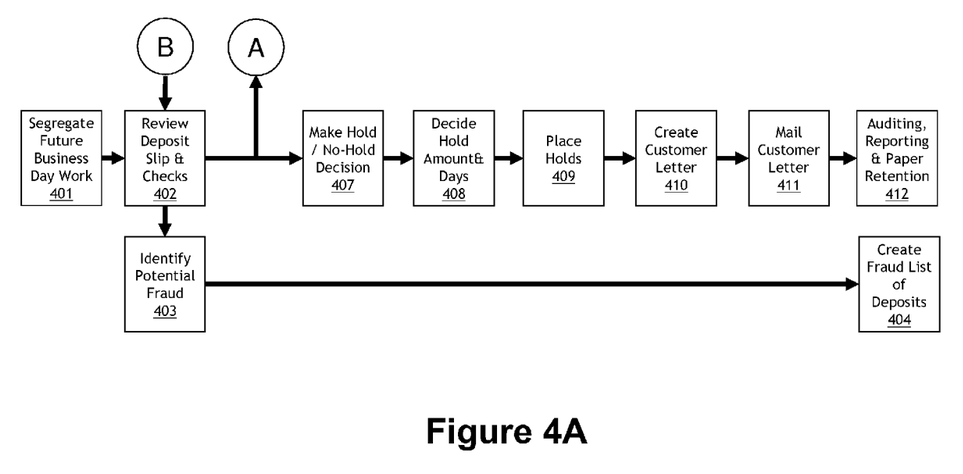
FIGS. 4A-4B are a flow chart of another illustrative method for reviewing and hold placement processing of deposit items in accordance with at least one aspect of the present invention.
Figure 4B:
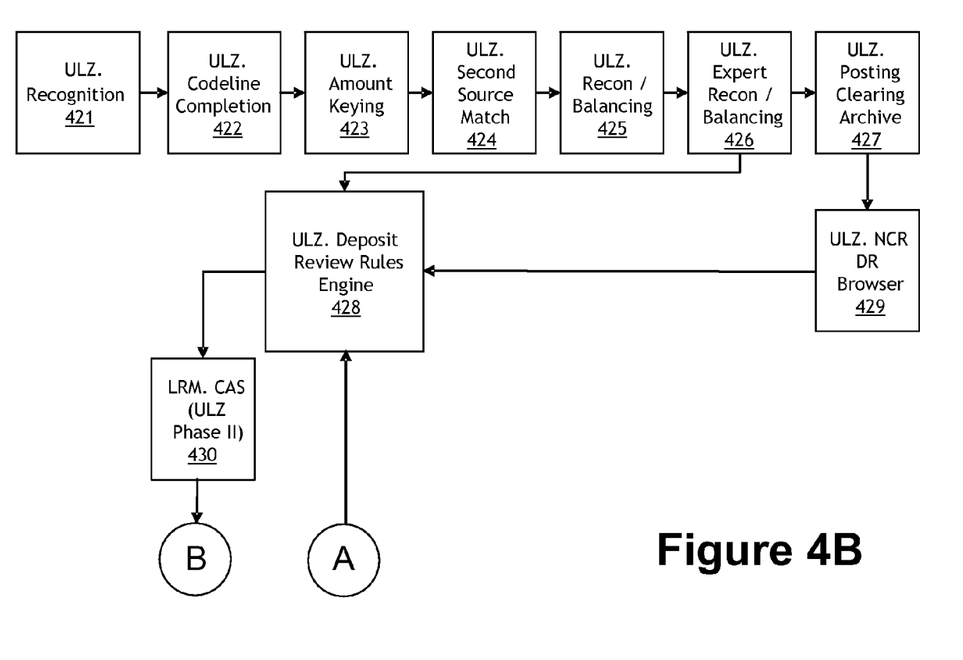

FIGS. 4A-4B are a flow chart of an illustrative method for automated reviewing and hold placement processing of ATM deposit items in accordance with one or more aspects of the present invention.

Reference elements 401-404, and 407-412 are similar to reference elements 301-304 and 307-312 from FIG. 3. The difference between the two is that the processes of FIG. 3 represent the paper environment while processes of FIGS. 4A-4B represent the image environment, i.e., implementation by image-enabled ATMs. In particular, reference elements 401-412 may be implemented by one or more computing devices, such as the computing device shown in FIG. 1, whether local to a user or remote. For example, in accordance with one or more aspects of the present invention, a user may access a computing device, such as an automated teller machine (ATM), and make numerous deposits of deposit items into the ATM. As part of the deposit process, a user may input a deposit slip with their account information and one or more monetary items, such as cash or a negotiable instrument, such as a check or money order.

At step 401, for each deposit item, a deposit posting day is recognized and an appropriate adjustment date is determined. Such a posting day may be determined by where a customer's account is domiciled and when the deposit item was made with regard to posting cut off times that are ATM specific. Future business day work is segregated from the current business day work. In accordance with one or more aspects of step 401, this is an automated process that may also be done per individual deposit item. For example, a computing device, such as an ATM, may receive individual deposit items from a user and perform the step 401 process for each item received. Therefore, cash may be processed immediately while an out of state check may be processed the next business day.

At step 402, the computing device may automatically review any deposit slip and any monetary items for each deposit item and then determines an adjustment type for each deposit item. This includes whether a deposit item is correct, is missing a component, such as a deposit slip or indication of an account to deposit into, includes an empty envelope, includes unacceptable item, or includes an improper endorsement. The computing device may determine the date of an adjustment based upon the business posting date of credit and the adjustment amount, e.g., a credit or debit to balance the transaction as needed. As part of this process, image-enabled ATMs or other computing devices may scan magnetic ink character recognition (MICR) for each deposit item being deposited. Example MICR data includes a routing and transit number (RT), a serial number, an account number of a user, and an amount of a monetary item. The computing device identifies the type of deposit item and then determines deposit item characteristics to base a hold/no hold decision. Examples of such characteristics include whether the deposit item is required for next day availability in accordance with Regulation CC. Examples include cash or general ledger, a U.S. Treasury item, a U.S. Postal Money Order, a Traveler's Check, a Federal Home Loan, and a Federal Reserve Bank check. Other characteristics include a cashier's check, official check, teller's check, certified check, local check, out of state check, and local government checks, whether by a city, state, or county. Still other examples also include exceptions as defined by Regulation CC, including repeated overdrafts, redeposited checks, new accounts, deposited checks that exceed $5,000.00, and emergency or special conditions.

Step 403 may also be another automated process that was formally only a manual process. In accordance with one or more aspects of the present invention, at step 403, the computing system may review scanned deposit items to identify fraud characteristics. Examples of fraud characteristics may include an indication that the payee name has been altered or that an amount on the deposit item has been altered. The computing system may be configured to read and identify characteristics of ink strokes or other data associated with the deposit item to determine whether the deposit item should be identified for special handling.

At step 404, the computing device may automatically generate a fraud list of deposits selected as being potentially fraudulent and/or adds data associated with the deposit item to an existing fraud list. As part of this step, the computing device may generate a daily watch list, which is accessible online. This daily watch list identifies data associated with potentially fraudulent deposit items for access by other computing devices and/or people. In addition, problematic deposit items that are not considered fraudulent, such as an empty envelope situation, may be handled and/or identified differently by the computing device. In such a situation, the deposit items associated with an empty envelope may be automatically processed to inform a user of the account associated with the deposit item that the envelope is or was empty. In accordance with one or more aspects of the present invention, when steps 401-404 are immediately processed at an ATM, a user at the ATM may be immediately notified by a message on the display screen and/or an audible message at the ATM that the submitted envelope is empty.

Proceeding to steps 421-430 shown in FIG. 4B, the computing system may adjust, i.e., debit, for unacceptable items via a financial data entry system and may adjust (debit) for non-balanced items. Specifically, at step 421, a Universal Landing Zone (ULZ), which is a network computing device that may be separate and distinct from the computing device described with respect to steps 401-404, is recognized. At step 421, the ULZ recognizes characters on a check image. Proceeding to step 422, if the MICR line is not complete, it is completed either automatically or by the user. At step 423, if the amount of the monetary item cannot be recognized with certainty, it is entered into the system. A data file is then received at step 424. At step 425, the deposit is ensured to be balanced. At step 426, complex deposits are ensured to be balanced. Deposit are sent for posting at step 427, and at step 428, deposits needing review are identified. At step 429, reviewed items are received from step 402. Then, at step 430, data for use in processing at step 402 is sent to step 402.

Returning to FIG. 4A and moving to step 407, the computing device may determine whether to hold a particular deposit item. In an alternative manner, a user may override the automated system to make a differing determination and/or to review the determination of the computing device. The determination by the computing system may be based upon a liability risk system (LRS) deposit risk score. Such a deposit risk score is well known in the industry.

In step 408, the computing device may determine the monetary amount of the hold and the time period in which to place a hold on the user account. Proceeding to step 409, a hold may be placed on the user account by the computing device. If a particular deposit item is not to have a hold placed on an associated user account, then steps 409-411 may be bypassed.

At step 410, a customer letter may be automatically created, by the computing device, for each deposit item identified as initiating a hold on the user account. With respect to this step, the computing device may utilize a template and associate account information of the user with the letter to generate a specific letter to the account owner with respect to the hold being placed on his/her account. The computing device may utilize one or more memories to associate data and generate a customer letter.

At step 411, the customer letter may be automatically mailed to the customer corresponding to the user account that has been placed on hold. Again, the computing device may directly process data in order to mail the customer letter and/or may include instructions for another device, such as printing specific computer, to print and mail a customer letter. Still further, electronic communication may be utilized in addition to or in place of a physical letter. In such a situation, the created customer letter from step 410 may be incorporated into an email message and/or other electronic notification to inform a user of an account that his/her account currently has a hold in place. Finally, at step 412, data representative of any aspect of the processes of steps 401-411 and 420-430 may be retained for auditing and reporting purposes in a memory associated with the computing device. Such a memory may be locally stored and/or may reside in an area physically separate from the computing device.

Figure 5:
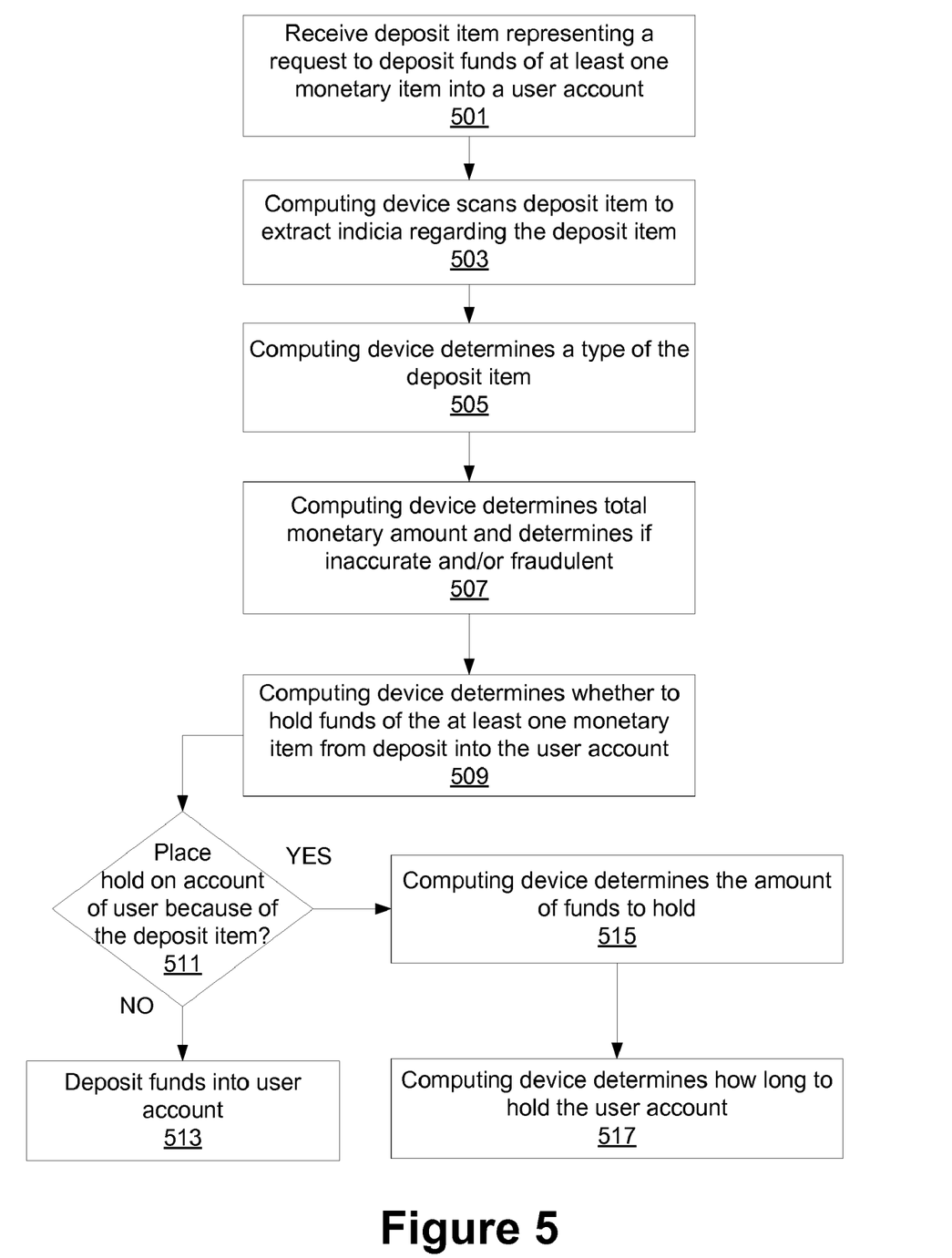
FIG. 5 is a flow chart of another illustrative method for reviewing and hold placement processing of deposit items in accordance with at least one aspect of the present invention.

FIG. 5 is a flow chart of an illustrative method for automated reviewing and hold placement processing of deposit items in accordance with at least one aspect of the present invention. The process starts at step 501 where a deposit item is received. The deposit item may be received at a computing device, whether local to or remote from a branch office of a financial entity. Computing device may be included within an automated teller machine (ATM) associated with a financial entity. The deposit item may represent a request to deposit funds of at least one monetary item into a user account.

A monetary item may include, but is not limited to cash and negotiable instruments, such as cashier's checks, money orders, and personal checks. The deposit item may include a deposit slip, with an account number and/or routing number, associated with a user account and/or a financial entity of the computing device and/or a separate financial entity. As such, a user is able to deposit monetary items into a bank account associated with a financial entity separate from and distinct to the financial entity associated with the computing device.

Proceeding to step 503, the computing device scans the deposit item to extract indicia regarding the deposit item. Such a scanning process may include reading/scanning magnetic ink character recognition (MICR) data associated with the deposit item. Such an example may include scanning MICR data from a monetary item. At step 505, the computing device determines the type of item the deposit item is. For example, a deposit item may be determined to include a monetary amount of cash and a monetary amount of negotiable instruments, such as money orders. In another situation, a deposit item may include a single check or multiple checks. Any of a number of different types may be included and/or determined.

At step 507, the computing device determines, for each deposit item, the total monetary amount and whether the deposit item is inaccurate and/or fraudulent. For a deposit item including cash and negotiable instruments, the total monetary amount of cash may be calculated/determined separately from the total monetary amount of negotiable instruments. In addition, other separate and/or group calculations/determinations may be made for any type of deposit item. In addition, a deposit slip associated with a deposit item may include an indication of the total monetary amount requesting to be deposited into a user account. Step 507 may include reading the deposit slip or other input associated with the deposit item where the deposit slip or input identifies a total amount of funds to deposit. This total read monetary amount may then be compared to the total calculated/determined monetary amount. If the two totals do not equal each other, a request for correction may be initiated and displayed to a user of the computing device. For example, a user may have inadvertently forgotten to place one of her checks for $42.00 into the computing device. The display would let the user know she is $42.00 short and the user could then submit the check to correct the discrepancy.

In addition, in step 507 the computing device may perform an inaccuracy and/or fraudulence check on one or more of the deposit items. The computing device may identify characteristics of the deposit item as potentially being fraudulent and/or inaccurate. Such a case may occur when the computing device runs an ink recognition program and determines that the payee name has been altered. Should the computing device determine the deposit item to be fraudulent, a user account may be debited the amount of the fraud until the problem is resolved. If determined to be fraudulent and/or inaccurate, the deposit item may be flagged as such by the computing device. In such an example, additional special handling may be required and the computing device may create a fraud list or other list of deposit items requiring review. Alternatively, if a fraud list has already been created, the particular deposit item may only be added to the fraud list.

At step 509, the computing device determines whether to hold funds associated with the deposit item from deposit into a user account associated with the deposit item. If a decision is made to not place a hold on the user account in step 511, such as if the deposit item is confirmed by the computing device to be accurate, the computing device may deposit the funds associated with the deposit item into the user account.

If a decision is made to place a hold on the user account in step 511, such as if the deposit item is confirmed by the computing device to be inaccurate, the computing device may place a hold on the funds of the deposit item with respect to the user account at step 515. In addition, the computing device may determine the amount to place a hold on. For example, the computing device may determine to place a hold on the entirety of funds and/or a portion of the funds.

Alternative to or in conjunction with step 515, at step 517, if a decision is made to place a hold on the user account in step 511, the computing device may place a hold on the funds of the deposit item with respect to the user account. In addition, the computing device may determine the time period in which to hold the amount of funds. For example, the computing device may determine to place a hold on the entirety of funds and/or a portion of the funds for a specific number of days.

Although not shown, other processes may occur in elation to the steps of FIG. 5. For example, if a hold to a user account is made, the computing device may transmit data corresponding to a request to automatically print a customer letter associated with the user account identifying a hold on the user account. Such a customer letter may be created at a remote site and/or locally by the computing device. Data associated with a hold on the user account may be retained in a memory. Such a memory may be external from and/or included within the computing device. This data may later be accessed by an auditing and reporting system for accounting, tracking, and/or information purposes.

In addition, it should be understood by those skilled in the art that one or more aspects of the present invention may be utilized within one or a plurality of computing devices. In addition, a computing device may include an automated teller machine (ATM). Such an ATM may be image-enabled.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method for automated processing of deposit items by a computing device, comprising:
   receiving a deposit item, the deposit item representing a request to deposit funds of at least one monetary item into a user account;
   determining, by the computing device, a total monetary amount of the at least one monetary item;
   receiving, by the computing device, an input associated with the request, the input identifying a total amount of funds to deposit;
   determining, by a computing device, whether the received input equals the determined total monetary amount of the at least one monetary item;
   upon determining that the received input does not equal the determined total monetary amount of the at least one monetary item, displaying a request for correction on a display associated with an automated teller machine; and
   determining, by a computing device, whether to hold the funds of the at least one monetary item from deposit into the user account.

2. The method of claim 1, wherein determining, by the computing device, whether to hold the funds of the at least one monetary item from deposit into the user account includes determining, by the computing device, an amount of the funds to hold and a time period in which to hold the determined amount of funds.

3. The method of claim 2, wherein the determined amount of funds is a portion of the funds of the at least one monetary item.

4. The method of claim 1, wherein determining, by the computing device, whether to hold the funds of the at least one monetary item from deposit into the user account includes determining, by the computer, a time period in which to hold a determined amount of funds.

5. The method of claim 4, wherein the time period is a specific number of days.

6. The method of claim 1, wherein upon determining to hold the funds of the at least one monetary item from deposit into the user account, the method further comprising determining, by the computing device, an amount of the funds to hold and a time period in which to hold the determined amount of funds.

7. The method of claim 1, wherein upon determining to not hold the funds of the monetary item from deposit into the user account, the method further comprising depositing the funds of the at least one monetary item into the user account.

8. The method of claim 1, wherein the request includes a deposit slip with an account number associated with the user account and the at least one monetary item.

9. The method of claim 1, wherein the at least one monetary item includes cash and a negotiable instrument.

10. The method of claim 1, further comprising determining, by the computing device, a type of the deposit item.

11. The method of claim 10, wherein the type of the deposit item is determined to be cash and at least one negotiable instrument.

12. The method of claim 11, wherein the determining, by the computing device, a total monetary amount of the at least one monetary item includes:
   determining, by the computing device, a total monetary amount of the cash; and
   determining, by the computing device, a total monetary amount of the at least one negotiable instrument.

13. The method of claim 1, wherein upon determining to hold the funds of the at least one monetary item from deposit into the user account, the method further comprising transmitting data corresponding to a request to automatically print a customer letter associated with the user account identifying a hold on the user account.

14. The method of claim 13, further comprising creating the customer letter in the computing device.

15. The method of claim 1, wherein upon determining to hold the funds of the at least one monetary item from deposit into the user account, the method further comprising retaining data associated with a hold on the user account in a memory.

16. The method of claim 15, wherein the memory is external from the computing device.

17. The method of claim 15, wherein the data is accessed by an auditing and reporting system.

18. The method of claim 1, wherein determining, by the computing device, whether to hold the funds of the at least one monetary item from deposit into the user account includes determining, by the computing device, whether the at least one monetary item is flagged for fraudulence check.

19. The method of claim 18, wherein upon determining to flag the at least one monetary item, adding the at least one monetary item to a fraud list of deposit items.

20. The method of claim 19, further comprising generating the fraud list of deposit items in the computing device.

21. The method of claim 1, further comprising:
reading, by the computing device, the deposit item;
determining the deposit item to be fraudulent; and
debiting the user account in response to determining the deposit item to be fraudulent.

22. The method of claim 1, wherein determining, by the computing device, whether to hold the funds of the at least one monetary item from deposit into the user account includes determining, by the computing device, whether to hold the entirety of the funds.

23. The method of claim 1, wherein the computing device is physically within an automated teller machine.

24. One or more computer-readable media storing computer-executable instructions which, when executed by a processor on a computer system, perform a method for automated processing of deposit items, the method comprising:
receiving a deposit item, the deposit item representing a request to deposit funds of at least one monetary item into a user account;
determining, by the computing device, a total monetary amount of the at least one monetary item;
receiving, by the computing device, an input associated with the request, the input identifying a total amount of funds to deposit;
determining, by a computing device, whether the received input equals the determined total monetary amount of the at least one monetary item;
upon determining that the received input does not equal the determined total monetary amount of the at least one monetary item, displaying a request for correction on a display associated with an automated teller machine; and
determining whether to hold the funds of the at least one monetary item from deposit into the user account.

25. A computing device enabling a financial entity to process deposit items, comprising:
means for receiving a deposit item, the deposit item representing a request to deposit funds of at least one monetary item into a user account;
means for determining, by the computing device, a total monetary amount of the at least one monetary item;
means for receiving, by the computing device, an input associated with the request, the input identifying a total amount of funds to deposit;
means for determining, by a computing device, whether the received input equals the determined total monetary amount of the at least one monetary item;
upon determining that the received input does not equal the determined total monetary amount of the at least one monetary item, means for displaying a request for correction on a display associated with an automated teller machine; and
means for determining, by a computer, whether to hold the funds of the at least one monetary item from deposit into the user account.

26. The one or more computer-readable media of claim 24, wherein upon determining to hold the funds of the at least one monetary item from deposit into the user account, the method further comprising determining, by the computing device, an amount of the funds to hold and a time period in which to hold the determined amount of funds.

27. The one or more computer-readable media of claim 24, the method further comprising determining, by the computing device, a type of the deposit item.

28. The one or more computer-readable media of claim 24, wherein determining, by the computing device, whether to hold the funds of the at least one monetary item from deposit into the user account includes determining, by the computing device, whether the at least one monetary item is flagged for fraudulence check.

* * * * *